(12) United States Patent
Checketts et al.

(10) Patent No.: US 8,348,002 B2
(45) Date of Patent: Jan. 8, 2013

(54) SLEWING RING DRIVE

(75) Inventors: Stanley Checketts, Providence, UT (US); Mike Winger, Smithfield, UT (US); Ryan Burleson, Bountiful, UT (US); Merin Swasey, North Logan, UT (US)

(73) Assignee: Boomerang Systems, Inc., Morristown, NJ (US)

( * ) Notice: Subject to any disclaimer, the term of this patent is extended or adjusted under 35 U.S.C. 154(b) by 4 days.

(21) Appl. No.: 13/004,552

(22) Filed: Jan. 11, 2011

(65) Prior Publication Data
US 2011/0168474 A1 Jul. 14, 2011

Related U.S. Application Data

(60) Provisional application No. 61/294,932, filed on Jan. 14, 2010.

(51) Int. Cl.
*B60K 1/00* (2006.01)
*B60K 17/30* (2006.01)

(52) U.S. Cl. ............. 180/252; 180/65.51; 180/200; 180/234; 180/253; 74/425

(58) Field of Classification Search ............ 180/6.2, 180/6.28, 6.44, 6.48, 6.5, 7.1, 7.2, 8.3, 23, 180/24.06, 24.07, 199, 200, 202, 234, 237, 180/252, 253, 254, 255, 65.51; 74/425
See application file for complete search history.

(56) References Cited

U.S. PATENT DOCUMENTS

| 4,125,169 | A | * | 11/1978 | Harris et al. ............. 180/6.5 |
| 4,280,578 | A | * | 7/1981 | Perkins ................. 180/6.5 |
| 4,461,367 | A | | 7/1984 | Eichinger et al. |
| 4,733,737 | A | * | 3/1988 | Falamak ............... 180/7.1 |
| 5,374,879 | A | * | 12/1994 | Pin et al. .............. 318/139 |
| 5,957,000 | A | * | 9/1999 | Pecorari ............... 74/425 |
| 6,491,127 | B1 | * | 12/2002 | Holmberg et al. ........ 180/252 |
| 7,296,643 | B2 | * | 11/2007 | Philipson .............. 180/65.1 |
| 7,789,175 | B2 | * | 9/2010 | Tobey et al. ............ 180/65.1 |
| 2001/0042646 | A1 | * | 11/2001 | van den Berg ........... 180/6.2 |
| 2004/0244521 | A1 | * | 12/2004 | Russ et al. ............. 74/425 |
| 2005/0212243 | A1 | * | 9/2005 | Terry .................. 280/79.11 |
| 2010/0181136 | A1 | * | 7/2010 | Swasey et al. ........... 180/253 |
| 2010/0219003 | A1 | * | 9/2010 | Rooney et al. ........... 180/9.1 |

FOREIGN PATENT DOCUMENTS

| JP | 59-209966 | 11/1984 |
| JP | 2001-173777 | 6/2001 |
| JP | 2005-231581 | 9/2005 |

OTHER PUBLICATIONS

International Search Report and Written Opinion for corresponding International Application No. PCT/US2011/020820 mailed Sep. 21, 2011.

\* cited by examiner

*Primary Examiner* — Tashiana Adams
*Assistant Examiner* — Marc A Scharich
(74) *Attorney, Agent, or Firm* — Graham Curtin, PA

(57) ABSTRACT

A drive and steering unit for driving and steering a load support comprises a steering assembly, a slewing ring engaged with the steering assembly and being rotatable about an axis in response to actuation of the steering assembly, a drive assembly mounted to the slewing ring, and a drive power system coupled to the drive assembly and movable with the slewing ring.

12 Claims, 4 Drawing Sheets

SLEWING RING DRIVE

CROSS-REFERENCE TO RELATED APPLICATIONS

This application claims the benefit of U.S. Application 61/294,932, filed Jan. 14, 2010, the contents of which are incorporated herein by reference. This application is also related to U.S. Application 61/145,543, filed Jan. 17, 2009, and U.S. Application 61/248,448, filed Oct. 3, 2009, and U.S. Application 61/258,006, filed Nov. 4, 2009, the contents of which are incorporated herein by reference.

FIELD OF THE INVENTION

The present invention relates to a wheel drive and steering unit for, in one embodiment, a load support such as an automatic guided vehicle (AGV) and other semi-automatic or manually controlled vehicles. More particularly, the present invention relates to a compact, low profile and robust drive and steering unit utilizing a slewing ring as a drive and steering assembly.

BACKGROUND

Conventional AGVs rely upon gear units that house separate drive and steering components that are adjacent to a load carried by a vehicle. For example, conventional AGVs employ two turnable and two non-turnable wheels, much like a forklift, where the drive and steering mechanisms are adjacent to the load. That design simplifies the mechanical components of the system, but limits the amount of the load a vehicle can carry and the maneuverability of the vehicle. The load is limited because the placement of the drive and steering components adjacent to the load increases the top-heaviness of the vehicle. Maneuverability is constrained because only two wheels are capable of turning.

In addition, existing drive and steering units are relatively delicate in construction, large in design, and provide minimal power for steering, drive, and load bearing functions relative to the overall size of the unit.

Slew ring drives are typically found in large scale applications including, but not limited to, truck cranes, swing yarders, solar trackers, marine cranes, utility equipment and various industrial sites. Slewing rings typically support heavy but slow-turning loads, and are designed to provide high output drive torque with high radial and axial load capability.

SUMMARY

The present inventors have discovered that the incorporation of a slewing ring into the drive unit overcomes load support problems of conventional AGVs where the extent of the load hampers the maneuverability of the drive and steering system. By using a slewing ring to support a drive wheel assembly, an AGV incorporating such a drive system is able to turn and steer without constraint and with less regard for the extent of the load applied to the drive system. Thus, there is provided a drive and steering unit for driving and steering a load support comprising a steering assembly and a slewing ring assembly. The slewing ring assembly is engaged with the steering assembly and is rotatable about an axis in response to actuation of the steering assembly. A drive assembly is mounted to the slewing ring such that a drive power system coupled to the drive assembly moves with the slewing ring.

BRIEF DESCRIPTION OF THE DRAWINGS

The accompanying drawings, which are incorporated in and form a part of this specification, illustrate certain embodiments of an omnidirectional drive and steering unit and together with the description, serve to explain certain aspects of the principles of this application.

DETAILED DESCRIPTION OF THE PREFERRED EMBODIMENTS

Figure 1:
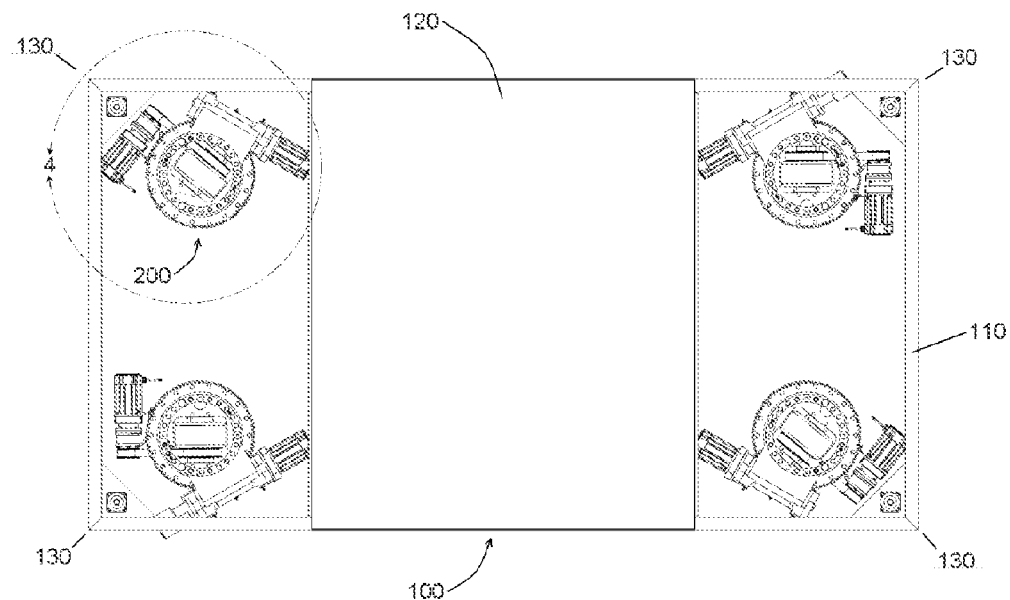
FIG. 1 is a top view of one embodiment of an AGV including the slewing ring drive of the invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
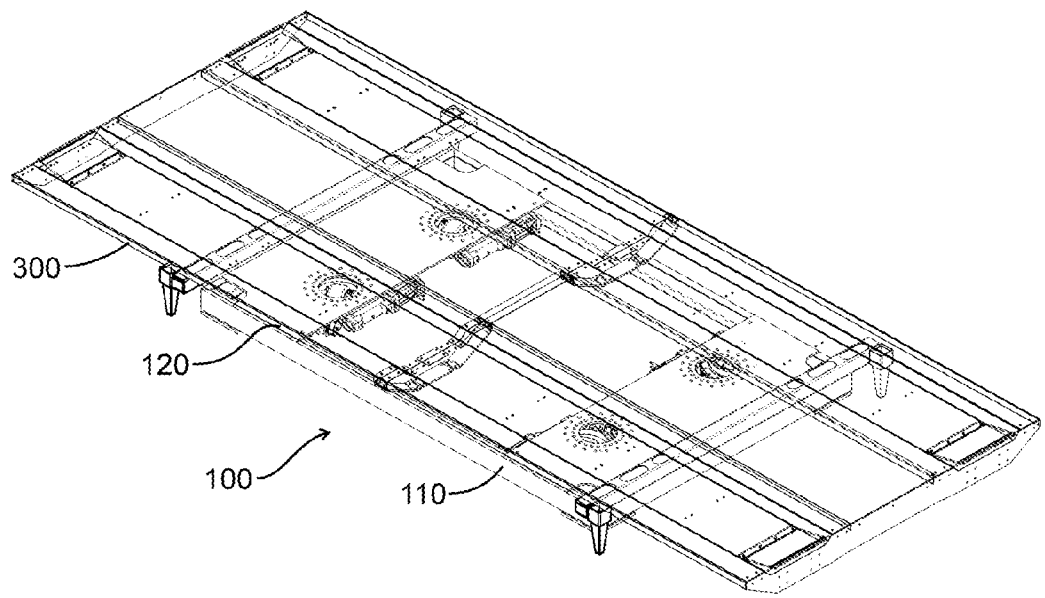
FIG. 2 is a perspective view of an AGV carrying a load.

FIG. 1 is a top view of one embodiment of an AGV 100 including a frame 110, a support surface or platform 120 and a plurality of drive units 200 secured to the bottom of the frame 110. The support platform 120 is partially cut away for purposes of clarity to show the drive units 200, it being understood that the support platform 120 would preferably extend to the borders of the frame 110 and would hide the drive units 200 from view except from the bottom or underside of the AGV 100. The support platform 120 comprises a load support on which a load 300 (FIG. 2 herein, which is reproduced from FIG. 22 of U.S. Application 61/258,006 ("the '006 application"), filed Nov. 4, 2009, incorporated herein by reference) is placed for transport by the AGV 100. Such load could, for example, comprise a tray upon which a vehicle or the like is driven and/or stored as described in the '006 application. Alternatively, the load 300 could be a storage locker as also described in the '006 application. Other non-limiting variations of loads are contemplated.

The embodiment of the AGV 100 shown in FIG. 1, for example, is generally rectangular in construction with drive units 200 positioned at each corner 130. However, the configuration of the AGV 100 need not be so limited. The AGV 100 could, for example, have a footprint that is square, oval, circular or the like (not shown). The AGV 100 could be any shape or configuration without departing from its lift and transport requirements. In addition, while four drive units 200 are shown, it will be understood that other than four drive units 200 may be utilized, at various locations relative to the frame 110, if desired by the needs of the user and taking into account the load demands and configurations. Such drive units 200 may be operated simultaneously or independently of each other.

Figure 3:
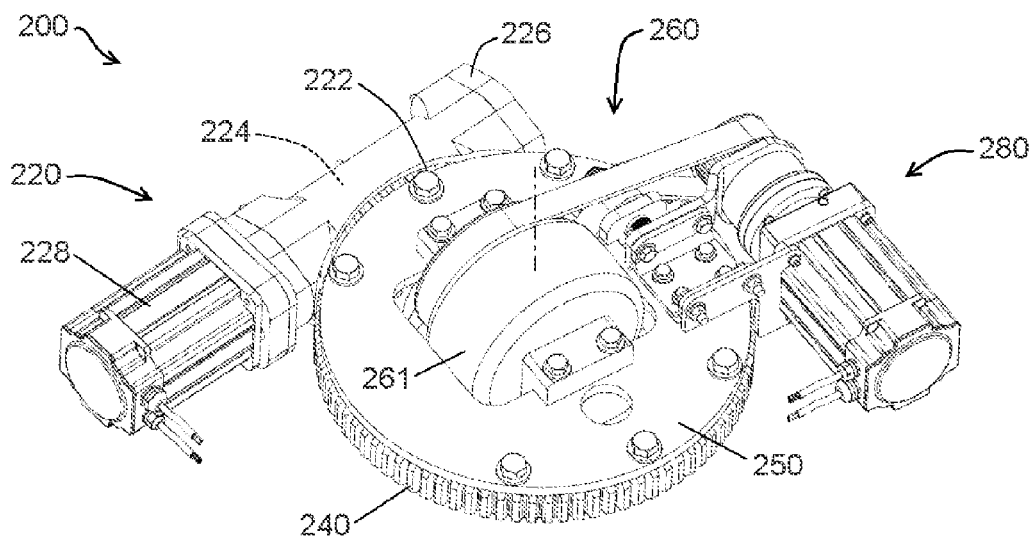
FIG. 3 is a perspective view of one embodiment of a drive and steering unit of the invention.
Figure 4:
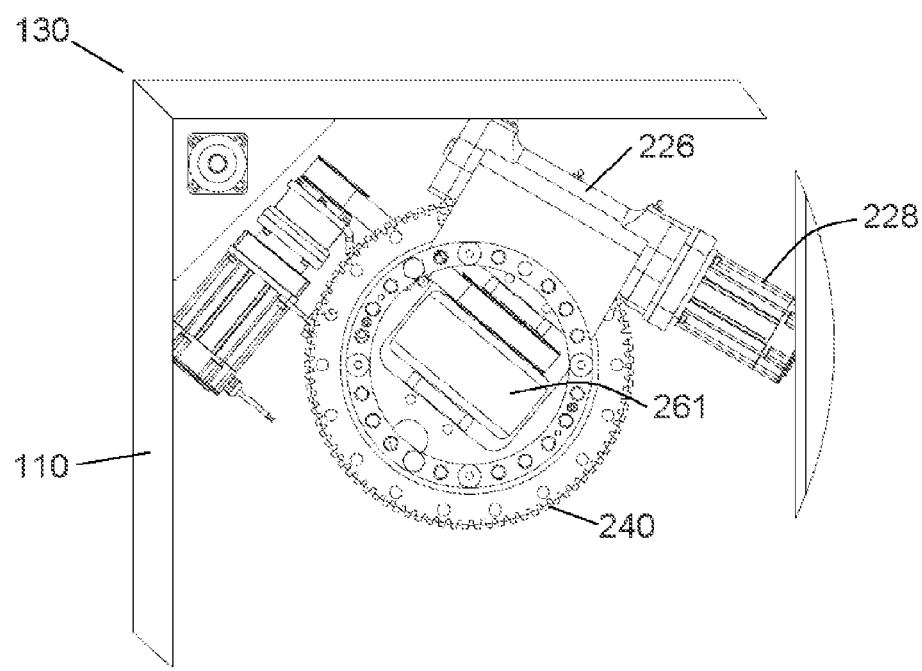
FIG. 4 is a close-up of section 4 from FIG. 1.

FIG. 3 illustrates one embodiment of a perspective view of a drive and steering unit 200 that is secured to an AGV 100 as shown, for example, in FIG. 1 and FIG. 4. The main components of the drive and steering unit 200 are a steering assembly 220, a slewing ring 240, a drive wheel assembly 260, and a drive power system 280. The drive wheel assembly 260, and in particular the drive wheel 261, is steered or rotated through the engagement of the slewing ring 240 with the steering assembly 220, while the drive power system 280 drives the drive wheel 261 forward or backward. The drive wheel 261 can be steered and driven independently or simultaneously through the independent or simultaneous operations of the steering assembly 220 and the drive power system 280 and/or the drive wheel assembly 260. The slewing ring 240 supports both the drive wheel assembly and the drive power system.

The steering assembly 220 preferably includes a worm steering assembly having a worm 222 and a worm shaft 224 housed within a housing 226, that is driven by a worm assembly power system 228. The steering assembly 220 is secured to the AGV 100, one possible location being shown in FIG. 4. The worm assembly power system 228 is typically energized by a rechargeable power unit or battery (not shown) located on the AGV 100. FIG. 4 illustrates one non-limiting positioning of the worm housing 226 near a corner 130 of the AGV 100, with the worm housing 226 being fixed to the AGV 100.

The slewing ring 240 is engaged with the worm 222 of the steering assembly 220 and is rotatable about an axis in response to movement of the worm 222. The slewing ring 240 rotates clockwise or counterclockwise depending on the rotation of the worm 222. The drive wheel assembly 260 is mounted to the slewing ring 240 via a mounting plate 250 that is fixed to the slewing ring 240 and serves as an anchor for both the drive wheel assembly 260 and the drive power system 280. The drive power system 280 is coupled to the drive wheel assembly 260 and is movable with the slewing ring 240 during rotation thereof. Thus, the slewing ring 240 supports both the drive wheel assembly 260 and the drive power system 280 and is able to dynamically and robustly steer or rotate the drive wheel 261 of the drive wheel assembly 260 and carry the drive power system 280 under an appreciable load. The robust load-bearing contribution of the slewing ring 240 allows the use of an increased diameter drive wheel 261, with a preferred wheel diameter of approximately eight inches. Of course, other dimensions are possible.

Figure 5:
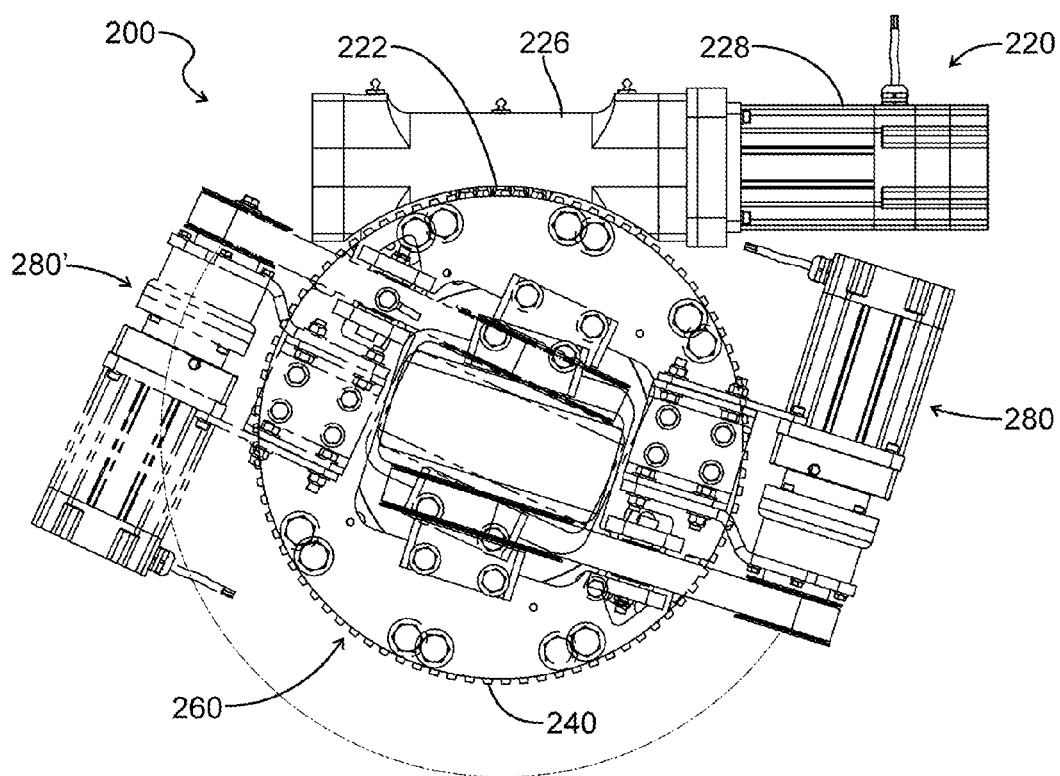
FIG. 5 illustrates one embodiment of a range of motion of the drive and steering unit of the invention.

In addition, depending on the placement of the unit 200 relative to the AGV 100, the steering range of the drive wheel assembly 260 and drive power system 280 is preferably approximately one hundred and eighty-five degrees as shown in FIG. 5 through movement of the drive power system 280 from one location 280 to another location 280'. Of course, other steering ranges are possible. However, depending on the positioning of the steering assembly 220 relative to the drive power system, the steering range is not likely to approach three hundred and sixty degrees as is the case with the omni-directional drive and steering unit described in U.S. Application 61/248,448, filed Oct. 3, 2009, incorporated herein by reference.

Figure 6:
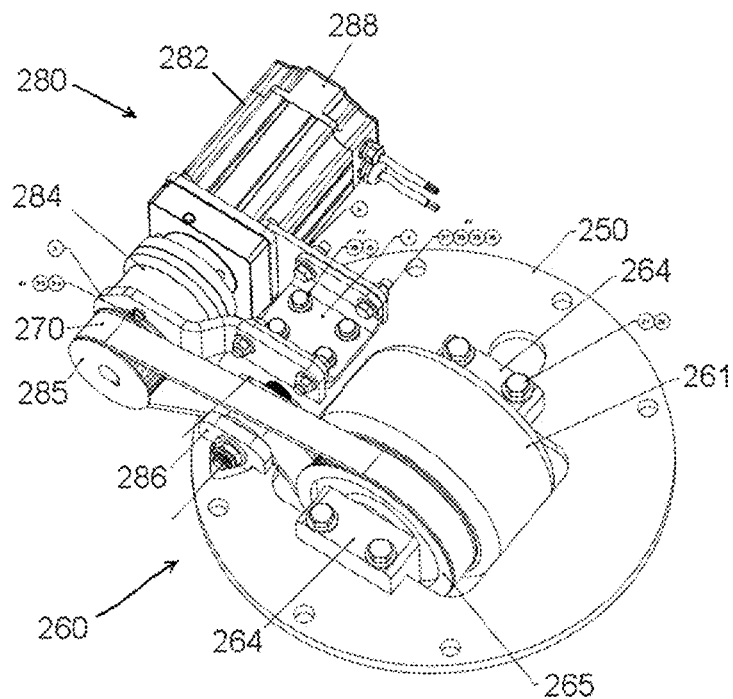
FIG. 6 is a perspective view of one embodiment of an assembled drive assembly mounted on a mounting plate.
Figure 7:
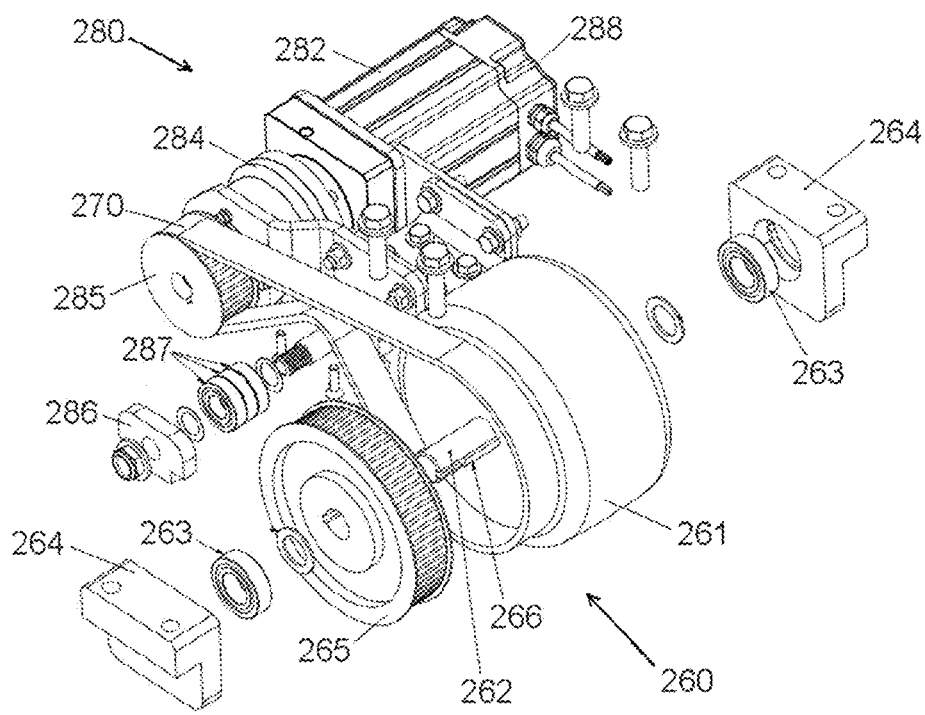
FIG. 7 is an exploded view of one embodiment of the drive assembly and drive power system of the invention.

FIG. 6 illustrates an assembled view and FIG. 7 illustrates an exploded view of one embodiment of the drive wheel assembly 260 and drive power system 280. The mounting plate 250 shown in FIG. 6 is removed from FIG. 7 for purposes of exposition. The drive wheel assembly 260 further comprises a drive wheel 261, a drive shaft 262 secured via bearings 263 within a pair of wheel mount blocks 264, and a drive wheel pulley 265 engaged with the drive shaft 262 by a drive wheel key 266. The wheel mount blocks 264 are fixed to the mounting plate 250 to fix the position of the drive wheel 261 relative to the slewing ring 240 (see FIG. 3). A timing belt 270 couples the drive wheel assembly 260, and in particular the drive wheel pulley 265, with a timing pulley 285 associated with the drive power system 280. The timing pulley 285 is driven by a motor 282 and controlled by a gearbox 284 coming off the motor 282. An idler support block 286 and associated bearings 287 defined between the timing pulley 285 and drive wheel pulley 265 function as a tensioner and a guide for the timing belt 270 and help maintain the timing belt 270 in alignment with the pulleys 285, 265. The power 288 for the drive power system 280 is typically energized by a rechargeable power unit or battery (not shown) located on the AGV 100.

During operation of the steering and drive unit 200, forward and backward movement is controlled by the drive power system 280 acting on the drive wheel assembly 260 through the timing belt 270. Rotation of the wheel 261 for steering the AGV 100 is executed by rotating the slewing ring 240 through the engagement of the worm drive steering assembly 220. As noted above, the forward/backward motion and steering motion can be affected independently or simultaneously.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A drive and steering unit comprising:
   a) a worm steering assembly having a worm and a worm shaft;
   b) a slewing ring engaged with the worm steering assembly and being rotatable about an axis in response to movement of the worm;
   c) a drive wheel assembly secured to the slewing ring, such that the drive wheel assembly is supported by the stewing ring; and
   d) a drive power system coupled to the drive wheel assembly, such that the drive power system is supported by and movable with the slewing ring.

2. The drive and steering unit of claim 1, further comprising a mounting plate fixed to the slewing ring to which the drive wheel assembly is secured.

3. The drive and steering unit of claim 2, wherein the drive wheel assembly further comprises a drive shaft secured within a pair of wheel mount blocks, the wheel mount blocks being secured to the mounting plate.

4. The drive and steering unit of claim 3, further comprising a drive wheel pulley secured to the drive shaft that is coupled to a timing pulley associated with the drive power system by a timing belt.

5. The drive and steering unit of claim 2, wherein the drive power system is secured to the mounting plate.

6. The drive and steering unit of claim 1, wherein the slewing ring is capable of less than 360 degrees of movement.

7. The drive and steering unit of claim 6, wherein the slewing ring is capable of approximately 185 degrees of movement.

8. The drive and steering unit of claim 1, wherein the worm steering assembly is fixed in position relative to the slewing ring.

9. The drive and steering unit of claim 1, further comprising a worm assembly power system that is independent of the drive wheel assembly.

10. The drive and steering unit of claim 1, wherein the worm steering assembly and the drive wheel assembly operate independently.

11. The drive and steering unit of claim 1, wherein the worm steering assembly and the drive wheel assembly are operable simultaneously.

12. The drive and steering unit of claim 1, wherein the worm steering assembly and the drive wheel assembly are each adapted to operate independently or simultaneously.

* * * * *